United States Patent [19]

Hoppe

[11] Patent Number: 4,636,304

[45] Date of Patent: Jan. 13, 1987

[54] DRUM SCREENING MACHINE

[75] Inventor: Kurt Hoppe, Hilden, Fed. Rep. of Germany

[73] Assignee: Hein, Lehmann AG, Dusseldorf, Fed. Rep. of Germany

[21] Appl. No.: 715,193

[22] Filed: Mar. 22, 1985

[30] Foreign Application Priority Data

Mar. 31, 1984 [DE] Fed. Rep. of Germany ....... 3412174

[51] Int. Cl.⁴ ............................ B07B 1/26; B07B 1/28
[52] U.S. Cl. ................................... 209/287; 209/293; 209/310; 209/379; 209/407
[58] Field of Search ............... 209/379, 287, 406, 407, 209/411, 310, 294, 291, 293, 296

[56] References Cited

U.S. PATENT DOCUMENTS

| 2,700,470 | 1/1955 | De Gail | 209/287 |
| 3,591,001 | 7/1971 | Quesnel | 209/287 |
| 3,633,745 | 1/1972 | Webner | 209/310 |
| 3,971,715 | 7/1976 | Webner | 209/310 |
| 4,188,288 | 2/1980 | Wehner | 209/310 |
| 4,269,703 | 5/1981 | Brüderlein | 209/310 X R |

Primary Examiner—S. Leon Bashore
Assistant Examiner—Thomas M. Lithgow
Attorney, Agent, or Firm—Karl F. Ross; Herbert Dubno

[57] ABSTRACT

The invention relates to a screening machine with a screening drum which rotates about its axis and has a screen made of elastic material. The characterizing feature of the invention is that the screening drum has at least one screening zone which has the shape of a cylinder or truncated cone and the length of which, in order to alternately stretch and relax the screen lining, can be changed in a vibrating manner in the axial or conveying direction.

6 Claims, 5 Drawing Figures

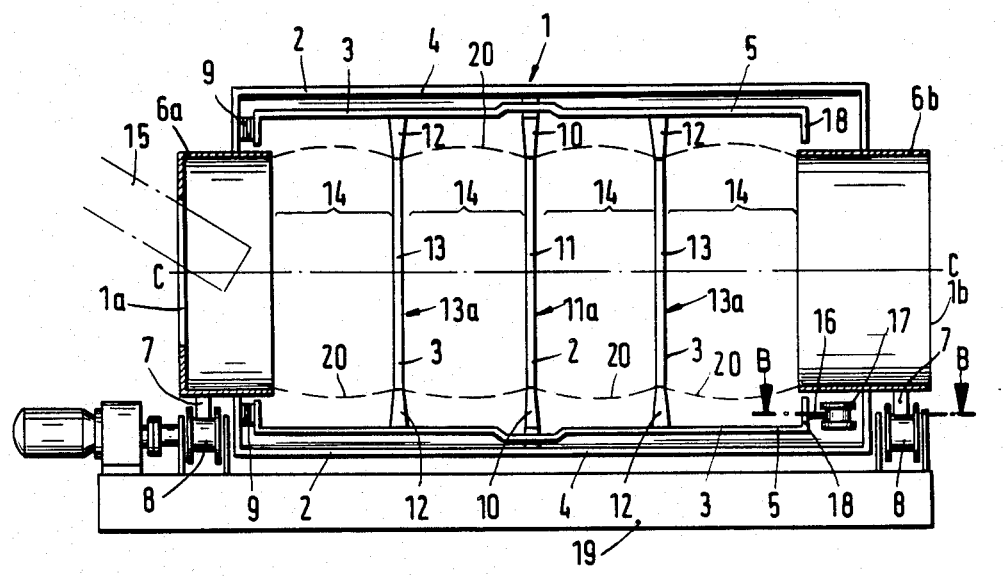
Fig.1 (A-A)
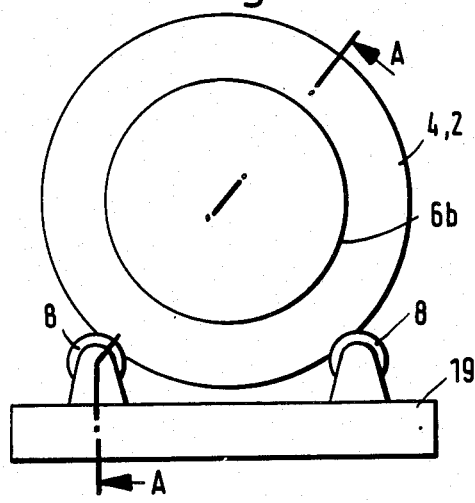
Fig.2
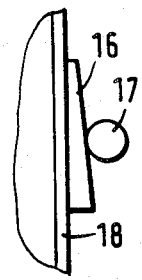
Fig.3 (B-B)

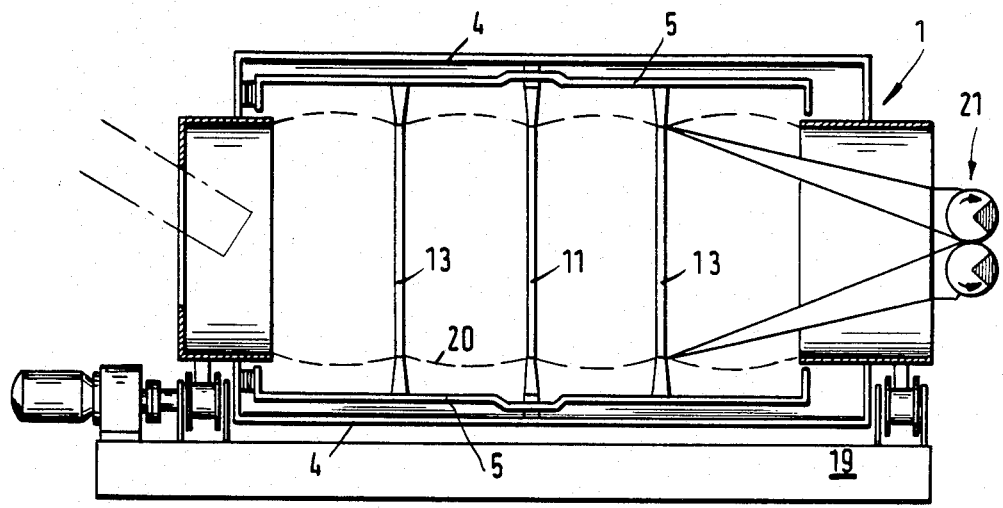
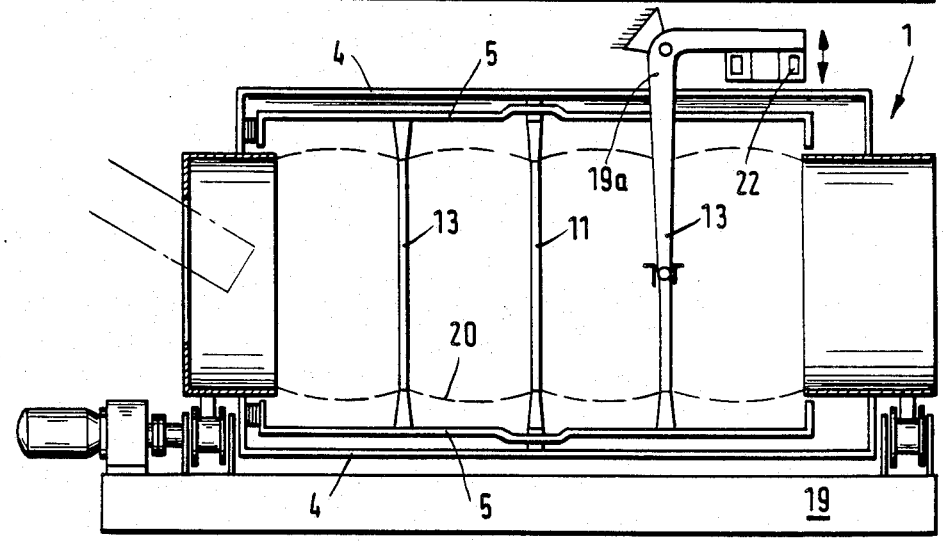

DRUM SCREENING MACHINE

The invention relates to a screening machine with a screening drum which rotates about its axis and has a screen made of elastic material.

After a while, many grading materials badly affect the screen lining of a drum screening machine, so that the screen lining has to be cleaned. This is time-consuming and leads to undesirable interruptions in the screening activity.

The object of the invention is to improve a drum screening machine in such a way that the screen lining possesses a very effective automatic cleaning action.

This object is achieved according to the invention by the screening drum having at least one screening zone which has the shape of a cylinder or truncated cone and the length of which, in order to alternately stretch and relax the screen lining, can be changed in a vibrating manner in the axial or conveying direction.

Because of the alternate stretching and relaxing, or extending and compressing, of the elastic screen lining in the annular areas of the screening drum, very effective automatic cleaning of the screen lining is achieved during screening. Since only a small area of the annular screening zone is covered with grading material, there remains in the centre and upper area a large free area of the screen lining which has sufficient time to clean itself because of the vibrating stretching and relaxing. Thus, work stoppages for cleaning the screen lining no longer occur, and even the most difficult grading materials can be processed.

In relation to the size of the screening area, the machine requires comparatively little space, and, moreover, any length of screening drum can be selected according to the material to be graded and the required screening output. In this connection, a modular construction of the screening drum and the screening machine comes into consideration.

It is of particular practical advantage if annular fixing areas for the screen lining are provided between two screening zones, and the fixing areas are fixed alternately to first parts of the screening drum, which first parts only rotate, and to second parts of the screening drum, which second parts rotate and at the same time vibrate in the axial direction. The fixing areas can also have coaxial rings, of which the first, only rotating, rings are connected to one another at the outside of the drum by first (longitudinal) parts which in particular are parallel to the axis, and the rotating and vibrating second rings are connected to one another at the outside of the drum by second (longitudinal) parts which in particular are parallel to the axis.

It is also proposed that the second parts of the screening drum which are arranged on the outside of the drum be fixed to the first parts by mountings which absorb vibrations. It is particularly advantageous if the first parts of the screening drum have two running rings or gear rims which are supported and driven by lower support rollers.

It is preferably proposed that the second parts of the screening drum are driven in a vibrating manner by cams, out-of-balance drives, eccentric drives and/or electromagnetic means. Moreover, the second parts of the screening drum can be driven at the front, end or centre of the drum. A method of construction which is simple in design is achieved by the first parts being formed by a first drum cage and the second parts being formed by a second drum cage.

Three illustrative embodiments of the invention are described in greater detail below and shown in the drawings, wherein:

FIG. 1 shows a section along A—A in FIG. 2;
FIG. 2 shows an end view of the screening machine;
FIG. 3 shows a section B—B in FIG. 1;
FIG. 4 shows a vertical longitudinal section through a second illustrative embodiment; and
FIG. 5 shows a vertical longitudinal section through a third illustrative embodiment.

The screening machine has a screening drum 1, the rotary axis C—C of which runs at a slight inclination to the horizontal, so that the screening drum slopes down from the feed end 1a to the discharge end. Apart from the slight inclination, however, it can be said that the screening drum 1 is essentially horizontal.

The screening drum has first parts 2 which rotate about the axis C—C, and second parts 3 which rotate about the axis C—C and also vibrate roughly parallel to the axis C—C. The first parts 2 can also be designated as a first drum cage and the second parts 3 as a second drum cage. The first parts 2 have first longitudinal supports 4 which are parallel to the axis C—C, extend over roughly the entire length of the screening-drum and are uniformly distributed in equal angular degrees on the outside of the screening drum. The longitudinal supports 4 are fixed at the feed end 1a to a cylindrical drum section 6a and at the discharge end 1b to a cylindrical drum section 6b, each of which is rigid and carries outer running rings 7 which are mounted on support rollers 8. One or even both of the running rings can be formed from a gear rim which meshes with gear wheels or pinions.

Inside the first longitudinal suoports 4, or also displaced laterally to the first longitudinal supports 4, second longitudinal supports 5 which are parallel to the axis are fixed by mountings 9 to the first longitudinal supports and/or to the drum sections 6a and 6b, which mountings 9 permit the second longitudinal support to move parallel to the axis relative to the first longitudinal support. Coaxial rings 11 are fixed to the first longitudinal supports 4 by radial distance pieces 10, and coaxial rings 13 are fixed to the second longitudinal supports 5 by radial distance pieces 12. These rings 11 and 13, together with fixing means (not shown), form fixing areas 11a and 13a for the screen linings. The rings 11 and 13 alternate with one another in the axial direction, so that one annular zone 14 each of the drum or screen lining 20 is fixed on one side to a ring 11 and on the other side to a ring 13. Since the screening drum rings 11 which belong to the first parts 2 only rotate about the axis C—C, and the rings 13 which belong to the second parts 3 do not just rotate about the axis C—C, but in addition vibrate parallel to the axis or essentially parallel to the axis because of the longitudinal supports 5, the annular screen lining of each zone 14 is alternately compressed and extended, or stretched and relaxed, parallel to the axis. In the illustrative embodiment, this occurs with all screening zones 14. But as an alternative, individual screening zones can be made to rotate only and not vibrate.

The grading material is brought into the screening drum from the feed end 1a by a feed device 15, is moved towards the discharge end in the lower area of the screening drum both by the vibrations and alternatively, in addition, by the inclination of the screening drum, and the constituents of the grading material which are large in diameter and do not pass through the screen openings are delivered at the discharge end. In the illustrative embodiment according to FIGS. 1 to 3, the second parts 3 of the screening drum, in particular the second longitudinal supports 5, are set in vibration parallel to the axis by cams 16 which run along rollers 17 of the base construction 19. The cams 16 are fixed to a rim 8 which carries the second longitudinal supports and roates as part of the screening drum. Alternatively, the second parts 3 of the rotating and vibrating movement system can be set in vibration by an out-of-balance motor 21 (FIG. 4) or by an electromagnet 22. Moreover, as shown in FIG. 5, a bell crank lever 19a can be driven in a vibrating manner on the outside and act in a vibrating manner on the rotating rings 13 via sliding pieces or rollers.

Whereas the annular screening zones 14 of the screen lining or the screening drum are cylindrical in all illustrative embodiments, they can also be in the shape of a truncated cone.

I claim:

1. A screening machine comprising:
    a screening drum defining an axis comprising first and second longitudinal support members;
    means for axially elastically connecting said first and second longitudinal support members;
    an elongated annular screen made of elastic material inside of said drum;
    means for circumferentially connecting said screen to said first support member;
    means for circumferentially connecting said screen to said second support member;
    means for vibrating said second support member in an axial direction;
    means connected to and not permitting axial motion of said first support member, for rotation said drum and screen therein.

2. A screening machine according to claim 1 wherein said means for circumferentially connecting said screen to said first support member comprises a first coaxial ring and wherein said means for connecting said screen to said second support member comprises a second coaxial ring.

3. A screening machine according to claim 1 wherein said means to vibrate said second support member includes means to vibrate said second support member in a linear manner.

4. A screening machine according to claim 1 wherein said means for rotating said drum and screen comprises two running rings, one ring connected to each of said first longitudinal support member ends, and support rollers for supporting and driving said running rings.

5. A screening machine according to claim 1 wherein said means for vibrating said second support member comprises any one of cams, out-of-balance drives, eccentric drives or electromagnetic means.

6. A screening machine according to claim 1 wherein said first longitudinal support means are formed by a first drum cage and said second longitudinal support means is formed by a second drum cage.

* * * * *